United States Patent [19]

Pack, Jr.

[11] 4,204,796
[45] May 27, 1980

[54] WIND POWERED APPARATUS

[76] Inventor: Howard Pack, Jr., 817 S. Post Rd., Midwest City, Okla. 73130

[21] Appl. No.: 943,935

[22] Filed: Sep. 20, 1978

[51] Int. Cl.² .............................................. F03D 3/04
[52] U.S. Cl. .................................... 415/2; 416/197 A
[58] Field of Search ....................... 416/197 A, 227 A; 415/2 R, 3, 4

[56] References Cited

U.S. PATENT DOCUMENTS

| 1,246,484 | 11/1917 | Souvielle | 416/197 A |
| 1,298,247 | 3/1919 | Muller | 415/2 R |
| 1,640,269 | 8/1927 | Ellison | 415/2 R |
| 1,764,052 | 6/1930 | Ffeifer | 415/2 R X |
| 2,252,523 | 8/1941 | Plotkin | 415/2 R |
| 4,012,163 | 3/1977 | Baumgartner et al. | 415/2 R |
| 4,134,708 | 1/1979 | Brauser | 415/2 R X |

FOREIGN PATENT DOCUMENTS

| 318376 | 1/1920 | Fed. Rep. of Germany | 415/2 R |
| 729533 | 12/1942 | Fed. Rep. of Germany | 416/197 A |
| 503530 | 6/1920 | France | 415/2 R |
| 544158 | 9/1922 | France | 415/2 R |
| 44460 | 2/1935 | France | 416/197 A |
| 1055052 | 2/1954 | France | 415/2 R |

Primary Examiner—Everette A. Powell, Jr.
Attorney, Agent, or Firm—William R. Laney

[57] ABSTRACT

A wind powered apparatus which includes an external wind shielding shroud supported for rotation about a vertical axis; a rotor mounted for rotation about the same axis as the shroud and disposed partially within the shroud; and a stabilizer vane secured to the shroud on the outer side thereof. The shroud includes two halves, each of conical configuration, with the halves oriented in base-abutting relation to each other. Each shroud half includes a plurality of generally triangularly shaped, overlapping vanes having air escape spaces provided between the overlapped edges thereof. The rotor includes a plurality of circumferentially spaced blades, each oriented in a plane containing the axes of rotation of the shroud and rotor, and each defining an opening between its radially inner edge and the axes of rotation of the shroud and rotor.

17 Claims, 7 Drawing Figures

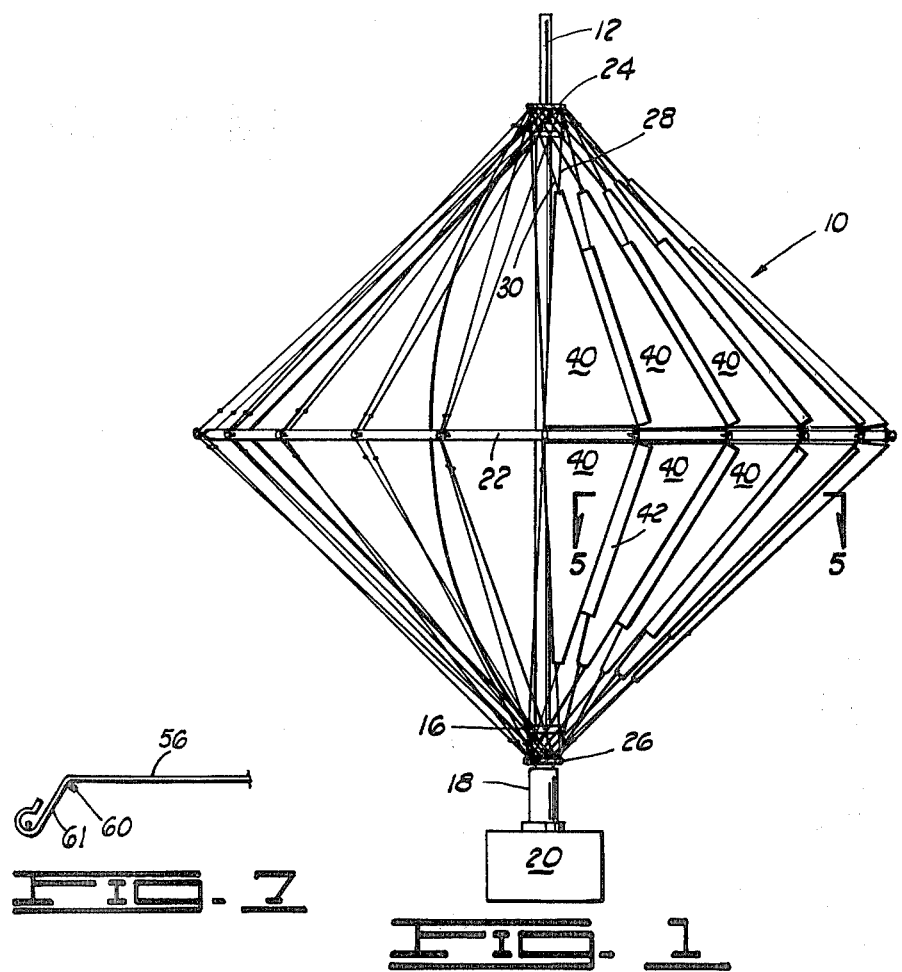
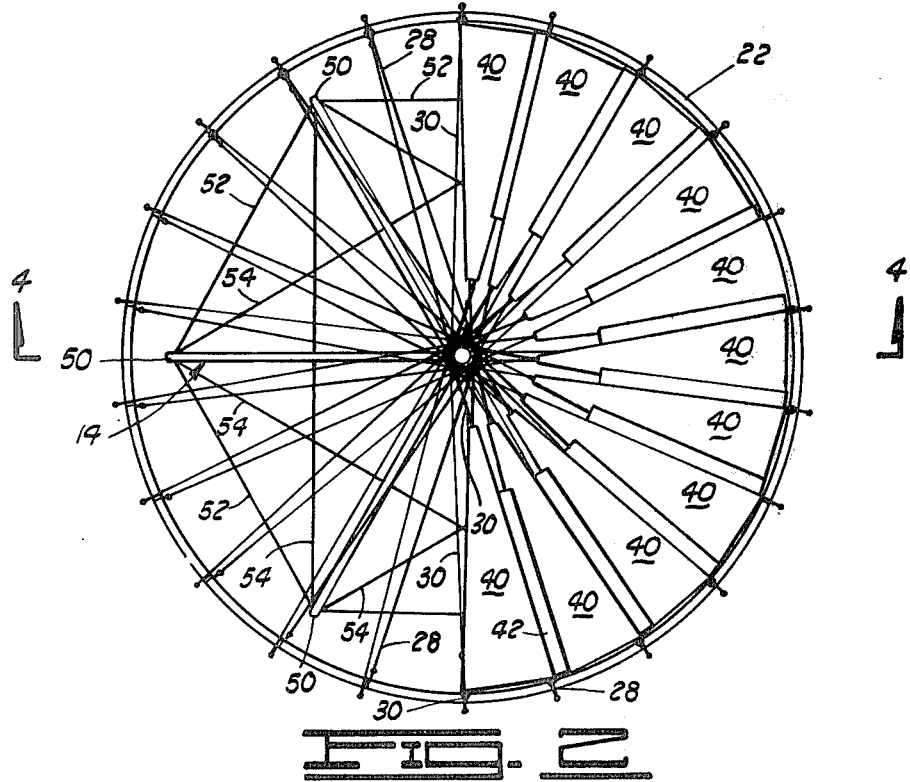

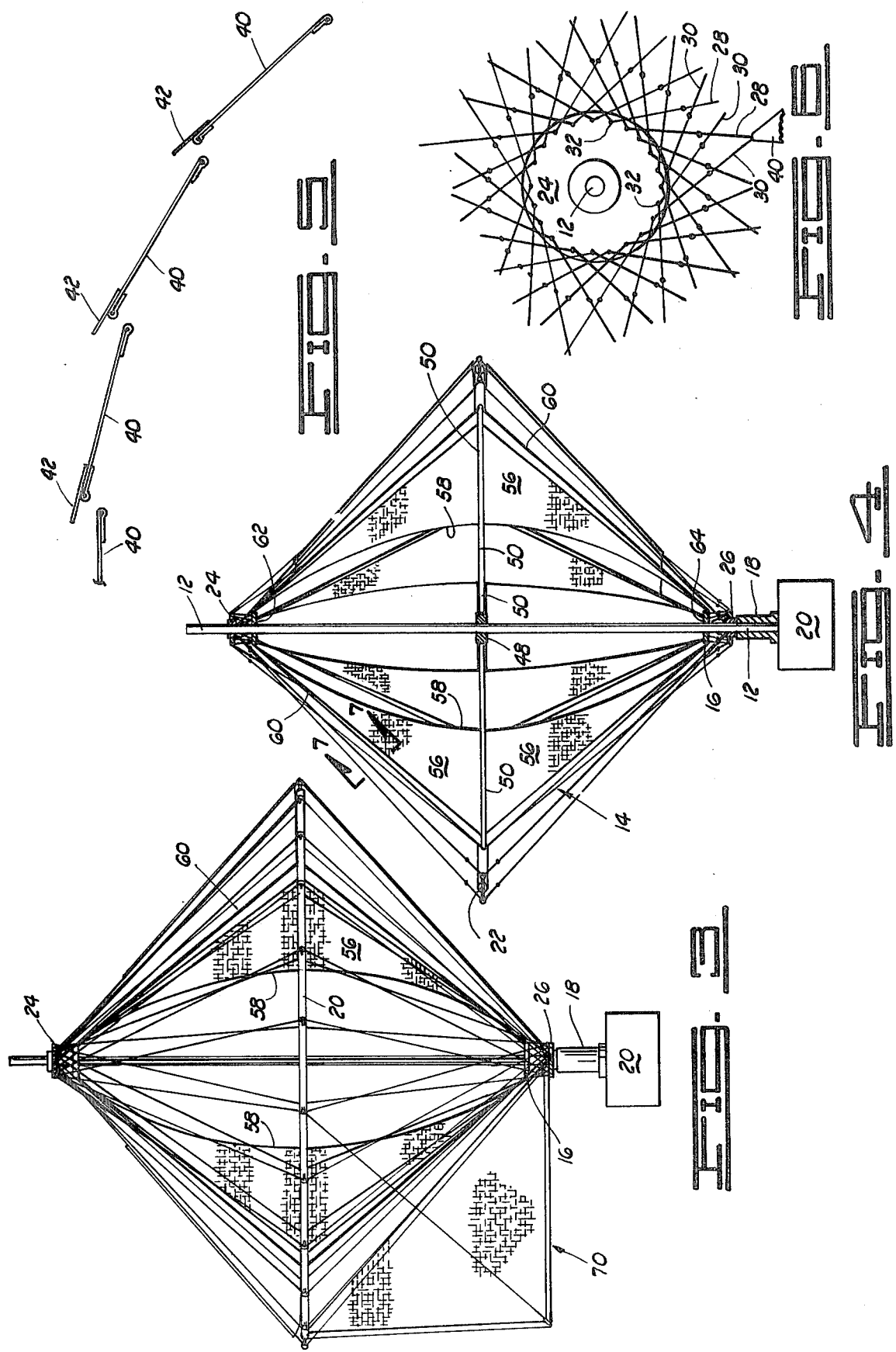

WIND POWERED APPARATUS

BACKGROUND OF THE INVENTION

1. Field of the Invention

This invention relates to wind powered generators and similar devices in which an impeller or rotor is caused to undergo rotation by the impingement of wind thereon. More particularly, the invention relates to those types of wind powered devices heretofore known wherein a rotor is mounted for rotation about a vertical axis, and is permitted to undergo rotation in response to the wind by reason of the partial shielding effect of a shroud which covers a part of the rotor and prevents counteractive forces from being developed on the motor.

2. Brief Description of the Prior Art

A number of devices have heretofore been proposed for permitting power to be generated by the impingement of wind on some type of rotative member which can respond to the wind by undergoing rotation, and thus developing mechanical motion which can be used for the generation of power. Efforts to improve the efficiency of devices of this type have recently been intensified in view of the diminishing supply of fossil fuels and the necessity to scrutinize alternate sources of energy.

One of the types of wind powered devices which has previously been proposed has utilized a rotor element mounted on some type of supporting structure to permit the rotor element to undergo rotation about a vertical axis. It has been proposed to include, in combination with such rotor element, some type of shroud or shielding device which orients itself, upon impingement of the wind thereupon, in a position to prevent the wind from impinging upon the blades or force-recieving elements of the rotor in a counterproductive fashion, i.e., on both that side of the rotor blades which will cause the rotor to turn in one direction, as well as upon the opposite sides of the blades after the blades have turned through 180°.

Devices of the sort which include a rotatable rotor responsive to the wind and a shielding or shrouding element which covers a portion of the blades of the rotor at some point during the total rotational travel of such blades are the windmill structure shown in Henderon U.S. Pat. No. 372,148; the shrouded windmill shown in Asperger U.S. Pat. No. 4,031,405; the wind impeller in Hings U.S. Pat. No. 2,542,522; the windmill in Wood U.S. Pat. No. 343,786; the windmill in McManigal U.S. Pat. No. 1,333,987, and the wind powered apparatus shown in Luchuk U.S. Pat. No. 3,970,409.

BRIEF DESCRIPTION OF THE PRESENT INVENTION

The present invention provides an improved wind powered apparatus which more efficiently responds to impingement of the wind thereon, and which, as is generally true of some prior art devices, includes a rotor element having a plurality of vanes positioned in an annular array, and oriented to receive the force imparted thereto by wind impinging on the vanes. Further, the wind powered apparatus of the invention includes, in conjunction with the rotor, an outer peripheral shroud which is configured to block approximately one-half of the vanes of the rotor from the wind as the initial leeward side of the vanes is brought around, through rotation of the rotor, to a position where, but for the interpostion of the shroud, the wind would impinge thereon, and therefore be counteractive with respect to the wind impinging upon the vanes when they are disposed 180° out of phase with their shielded position. The rotor, because of the manner in which the shroud is constructed, and also due to the configuration of the rotor vanes, utilizes a greater proportion of the total force potentially available in the moving air constituted by the wind, and thus operates more efficiently than devices of this type previously proposed. Broadly described, the three major components of the wind powered apparatus of the invention include the external, wind-shielding shroud element which is supported for rotation about a vertical axis; a rotor mounted for independent rotation about the same axis as the shroud and disposed partially within the shroud; and a stabilizer vane secured to, and projecting outwardly from, the outer side of the shroud. The shroud includes two halves, each of which is of conical configuration with the halves oriented with respect to each other so that their bases abut each other. Each shroud half includes a plurality of generally triangularly shaped, overlapping vanes having air escape spaces provided between the overlapped edges thereof. The rotor includes a plurality of circumferentially spaced blades, each oriented in a plane containing the axes of rotation of the shroud and rotor, and each defining an opening between its radially inner edge and the axes of rotation of the shroud and rotor.

An important object of the present invention is to provide an improved wind powered apparatus which efficiently converts the energy in moving air to mechanical energy.

Another object of the invention is to provide an improved wind powered apparatus which is mechanically strong in its construction and relatively economical to fabricate and assemble.

Additional objects and advantages of the invention will become apparent as the following detailed description of the invention is read in conjunction with the accompanying drawings which illustrate a preferred embodiment of the invention.

BRIEF DESCRIPTION OF THE DRAWINGS

FIG. 1 is a side elevation view of the wind powered apparatus of the invention.

FIG. 2 is a plan view of the wind powered apparatus illustrated in FIG. 1.

FIG. 3 is a side elevation view of the wind powered apparatus of the invention as it appears when it is rotated 90° from the position shown in FIG. 1.

FIG. 4 is a sectional view taken along line 4—4 of FIG. 2.

FIG. 5 is a sectional view taken along line 5—5 of FIG. 1.

FIG. 6 is a detail plan view showing the manner in which guy wires forming a portion of the shroud of the wind powered apparatus are attached to a shaft carried hub.

FIG. 7 is a sectional view taken along line 7—7 of FIG. 4.

DETAILED DESCRIPTION OF A PREFERRED EMBODIMENT OF THE INVENTION

Referring initially to FIG. 1 of the drawings, the wind powered apparatus of the invention is illustrated therein and includes an air shield or shroud designated generally by reference numeral 10, which shroud is supported upon a vertically extending shaft 12 for rotation on this shaft in a manner hereinafter described.

The apparatus further includes a rotor designated generally by reference numeral 14. The rotor 14 is also mounted for rotation about the vertically extending shaft 12. The rotor is keyed to the shaft 12 for rotation independently of the shroud 10. The rotor 14 is carried upon a suitable lower hub 16 keyed to the shaft 12 which extends at its lower end through a suitable journal sleeve 18 into a generator indicated schematically at 20. Any suitable tower structure or the like can be used for supporting the wind powered apparatus at a vertically elevated location where it is susceptible to impingement of the wind thereon.

Referring in greater detail to the construction of the shroud 10, this element comprises an external rigid ring or annular member 22 which lies in a plane extending substantially normal to the axis of the shaft 12. This plane is located substantially midway between an upper bearing or journal hub 24 and a lower bearing or journal hub 26. The bearing or journal hub 24 is mounted for free rotation upon the shaft 12, as is the bearing or journal hub 26, which rests upon the journal sleeve 18.

The shroud 10 further includes a plurality of structural supporting guy wires, which can best be described in pairs. Thus, one pair of guy wires is designated in FIG. 1 by reference numerals 28 and 30. It will be perceived that the lower, outer ends of each of these wires 28 and 30 are anchored or secured by any suitable means to the ring or annular member 22, and that the upper end portions of the two wires are crossed at a location near the journal hub 24 and are secured, as shown in FIG. 6, through appropriate eyes or apertures 32 formed around the periphery of the journal hub 24. This arrangement of pairs of the guy wires is repeated around the entire outer periphery of the upper and lower portions of the shroud 10.

It will be perceived in referring to the drawings that the shroud 10 includes a conically shaped upper portion and a conically shaped lower portion. Effectively, however, the wind reactive portions of this shroud 10 include two semi-conical portions in base-to-base relation, and this configuration will be better understood from the following description.

Commencing with the guy wires 28 and 30, each pair of guy wires positioned for a limited circumferential distance counterclockwise thereof as the apparatus is viewed in plan in FIG. 2, has secured between each of the guy wire pairs a vane of subsstantially triangular configuration and designated by reference numeral 40. It will be noted that the series of flaps or vanes 40 which is thus provided includes a sufficient number of flaps or vanes to cover 180° of the total conical shape of the upper half of the shroud or, stated differently, to permit the series of vanes to be terminated at a diametric plane which is coincident with the axis of the shaft 12. In the illustrated embodiment of the invention, eleven of the vanes 40 are illustrated, and thus each triangular flap or vane defines an angle of about 16°20′. Each generally triangular vane 40 terminates at a location spaced radially outwardly from the shaft 12, and the vanes collectively define a pair of open spaces at the top and bottom of the shroud and surrounding the shaft.

The guy wires which are symmetrically arrayed around both the upper and lower halves of the shroud are also provided on the open (non-vaned) side of the shroud, as is clearly illustrated in FIG. 2, and each pair of the guy wires is similarly extended and anchored at its opposite ends to the annular member 22 and to the respective journal hub 24 or 26.

In further discussions of the wind powered apparatus of the invention, it will be helpful to establish, in reference to the drawings, an orientation of the apparatus as there illustrated to the direction of wind impingement upon the apparatus. FIG. 1 shows the apparatus oriented in the attitude which it would assume if the wind were directed against it from a direction extending normal to the paper containing the drawing. FIG. 2 is correspondingly illustrative of the apparatus as it would appear in plan if the wind were impinging upon the apparatus from a direction coincident with the vertical axis of the drawing sheet upon which FIG. 2 appears and were blowing from the bottom of the page toward the top. With this attitude of the apparatus and the assumed wind direction, the rotor, subsequently to be described, would be rotated in a clockwise direction, as the apparatus is viewed in FIG. 2, and the shroud 10 would become stabilized, upon impingement of the wind thereupon, in the position illustrated in FIG. 2.

Considering, then, the direction of rotation of the rotor to be clockwise in FIG. 2, and referring again to the vanes 40 of the shroud, each of these vanes carries a trailing flap 42 which extends across and overlaps the leading edge of the next adjacent vane in a counterclockwise direction. Further, as shown in FIG. 5, the flap 42 secured to the trailing edge of each of the vanes 40 is spaced radially outwardly from the leading edge of the next adjacent flap to provide an air escape space between the flap and the leading edge of the next adjacent vane. This relative orientation of adjacent vanes 40 and the flaps 42 secured thereto is characteristic of all the vanes and associated flaps. It should be pointed out, and will be understood, that each flap 42 can be constructed integrally with the respective vane 40 to which it is attached, rather than being made a separate element secured to the vane.

As previously indicated, the rotor 14 is keyed to the shaft 12 for rotation with this shaft about its axis, and for rotation independently of the shroud 10. The rotor 14 thus includes a central hub 48 drivingly mounted on the shaft 12 and having projecting therefrom, a plurality of radially extending spokes 50. In the illustrated embodiment of the invention, six of the spokes 50 are provided and are oriented with respect to each other such that adjacent spokes define an angle of 60° therebetween. At the outer end of the radially extending spokes 50, the spokes are interconnected by suitable wires or rods 52 which project between and interconnect the radially outer ends of adjacent pairs of the spokes. Secondary stays 54 are also provided and extend between the radially outer ends of each spoke pair made up of every other spoke 50 (see FIG. 2). It will be apparent that the rods 52, stays 54 and the radially extending spokes 50 all occupy a common, substantially horizontal plane which extends normal to the axis of the shaft 12.

As best illustrated in FIGS. 3 and 4, the rotor 14 further includes a plurality of wind reactive members such as blades or vanes 56. Although each of the blades or vanes 56 may be constructed of various materials, in the illustrated embodiment the material is a fabric. The rotor 14, in its entirety, is configured as a pair of base-to-base conical members, with the upper cone defined by the array of vanes 56 extending upwardly from the plane containing the spokes 50, and the lower cone defined by the array of lower vanes 56 extending downwardly from the spokes 50. Each of the blades 56 lies in a plane which extends through and contains the axis of the shaft 12, and each vane is spaced radially outwardly from the shaft 12 as illustrated in FIG. 4. It will be perceived that the vanes 56 are oriented in aligned pairs, with an upper vane aligned in the same plane as one of the lower vanes with the vanes in the pair meeting at one of the spokes 50. In fact, each vane pair, including an upper vane and a lower vane, may be formed as a single element from one unitary piece of material with the central portion of the vane joined to the respective spoke 50.

Each pair of aligned upper and lower vanes 56 is compositely configured as a rough or general triangle, with the base of the triangle being defined by an arcuate radially inner edge 58. The arcuate radially inner edge 58 of each vane is curved in a concave configuration so that that space which is left open between the radially inner edge of each vane and the central shaft 12 is substantially equivalent in area to the total area of the vane 56 having that radially inner edge. In other words, the total surface area of each of the vanes 56 is substantially equivalent to the total open or void area existent between the radially inner edge of the vane and the shaft 12.

At its radially outer edge, each of the vanes 56 is secured to a structural element, such as a guy wire or rod 60. Each vane 56 also carries at its radially outer edge, a turned over fence flap 61 which extends at an angle of about 45° to the major plane of the vane to which it is attached. The guy wires 60 collectively lie in the peripheral outer surface of the conically shaped upper and lower halves of the rotor, and each guy wire is anchored or secured at its outer end to the outer end of one of the spokes 50, and at its radially inner end to the hub 16 which is keyed to the shaft 12 for rotation with the shaft, or to a similar hub 62 which is provided around the upper end portion of the shaft 12, and provides an anchor point for securing the upper radially inner ends of the guy wires used to support the radially outer edges of each of the upper vanes 56. The hub 48, by fixation to the shaft 12, imparts rotation to the shaft which extends through the sleeve 18 into a suitable housing 20 containing conventional power generating means (not shown) by which the rotative motion of the sleeve 66 can be converted to electrical power.

For the purpose of directionally orienting the shroud 10 with respect to the wind direction, a stabilizer flap or vane, designated generally by reference numeral 70, is provided. The stabilizer vane 70 is of generally triangular configuration and is secured to the outer side of the lower portion of the shroud 10 at a location so that it extends in the vertical plane which contains the aligned edges of the vanes 40 which are adjacent the closed portion of the shroud 10.

USE AND OPERATION

In operatively placing the wind powered apparatus of the invention, it is erected upon a suitable supporting structure in a position to intercept the prevailing winds in the place where it is to be employed. The shaft 12 which is drivingly connected to the rotor 14 is connected to a suitable generating device, such as that schematically indicated at 20 in the drawings.

With the wind powered apparatus positioned at an elevated location in the path of wind flow, the stabilizer flap or vane 70, by reason of the impingement of the wind thereupon, moves to a position in which it is feathered and offers the least resistance to wind flow. In moving to this position, it carries with it the air shield or shroud 10 which is supported upon the vertically extending shaft 12 for free rotation. When the stabilizer vane 70 is moved to a feathered position, the shroud 10 is moved to a position where the plane defining the axial boundary of the semi-conically shaped vane arrays of the upper portion and lower portions of the shroud is aligned with the direction of wind flow. Stated differently, the plane which extends across and includes the limiting edges of the bounding vanes included in the upper portion and lower portion of the shroud passes through the rotational axis defined by the shaft 12. In this position, the shroud 10 protects and shields one-half of the rotor from impingement by the wind, and causes the force of the wind to be exerted only upon one-half of the rotor or, stated differently, to act upon the rotor blades or vanes 56 only over 180° of the total rotor dimension.

As the wind impinges upon the blades or vanes 56 of the rotor 14, the rotor is driven in rotation about the rotational axis defined by the shaft 12 and, in undergoing rotation, causes rotation of the shaft 12 so that the generator 20 can be driven to generate an electrical current.

As the rotor 14 undergoes rotation as a result of impingement of the wind upon the vanes or blades 56 thereof, the effect of the vane movement is to pull air in through the top and bottom portions of the wind powered apparatus, or stated differently, to draw wind in along the upper and lower portions of the shaft 12, and inwardly toward the central portion of the apparatus. This draft effect tending to move the wind in this direction is in part caused by the vacuum pulled by the moving vane, and in part by the flow of air outwardly through the air slots provided adjacent the overlapping trailing edge of each of the shroud vanes 40 where this trailing edge overlaps the leading edge of the next adjacent shroud vane 40. I have found that a very workable arrangement is to provide an overlap at this point of approximately 1/10th of the total shroud vane width, with a space between the leading vane and the trailing vane approximately equivalent to the overlap of the vanes.

The movement of the air drawn in through the top and bottom of the wind powered apparatus appears to create an eddy current moving clockwise around the axis of the shaft 12 which aids the rotation of the rotor vanes as a result of an effective reduction in the static air load which otherwise would oppose rotation of the rotor blades. The eddy currents developed around the shaft 12 also appear to aid in the direction of the total air contained between the shroud and the rotor out through the air slots formed between the vanes of the shroud, and in this way to aid in the stabilization of the shroud in its desired rotor shielding position. Hunting of the shroud is thus prevented due to overreaction of the stabilizer vane 70.

I have found that the double conical shape of the rotor and its associated shroud appears to present the best aspect ratio for use in this type of wind powered apparatus, i.e., the type which contemplates the use of vertical axes of rotation characterizing a rotor partially shielded by a surrounding shroud.

A further important aspect of the construction of my wind powered apparatus is the provision of rotor vanes which occlude only approximately 50 percent of the total areal space between the guy wires supporting the outer boundary edges of these vanes and the central rotational axis of the rotor. Moreover, the shroud very greatly increases the efficiency of the wind powered apparatus as contrasted with a non-shrouded apparatus, with such increase in efficiency being an effective tripling thereof by my measurements and observations.

The turned over rotor blade edges in which the relatively short leading edge lip is oriented at about 45° with respect to the main plane of each rotor blade also substantially enhances the efficiency of the device, and experiments have confirmed the superiority of this structure over monoplanar rotor blades lacking the turned over leading edge.

Although various embodiments of the rotor utilized can be employed, I prefer the six-bladed rotor illustrated in the drawings, although rotors having more or fewer blades can be used.

It should further be noted that the slotted vane construction of the shroud, in conjunction with the orientation with the stabilizer vane 70 with respect to the shroud, enables the stabilizer vane to initially deflect wind to the air passageways formed between vanes of the shroud, and from thence on to the rotor blades 56 in a direction such that the rotor will be caused to undergo start-up rotation, even while the stabilizer vane is shifting toward its feathered position for the purpose of bringing the shroud to its effective operating position.

Experiments which I have conducted indicate that the wind powered apparatus of the invention has an efficiency such that 51.12 percent of the theoretical usable power available in the wind is recovered by the device and converted into mechanical energy in the rotation of the shaft 12.

Although a preferred embodiment of the invention has been herein described in order to illustrate the principles constituting the foundation for the invention, it will be understood that various changes and innovations in structure, and relative orientation of structure, can be effected without departure from these principles. Such changes and modifications to the illustrated embodiment are therefore deemed to be circumscribed by the spirit and scope of the invention except as the same may be necessarily limited by the appended claims or reasonable equivalents thereof.

What is claimed is:

1. A wind powered apparatus comprising:
    an external wind shielding shroud including
        an upper half of semi-conical configuration and
        a lower half of semi-conical configuration abutting said upper half in base-to-base relation;
        each of the shroud halves including a plurality of generally triangularly shaped overlapping vanes having air escape spaces provided between the overlapped edges thereof;
    a rotor disposed partially within the shroud and including a plurality of circumferentially spaced blades, each oriented in a plane intersecting the planes containing the other rotor vanes in a common line;
    means supporting the rotor and shroud for rotation about a common rotational axis coincident with the line of intersection of said planes; and
    stabilizer means secured to the shroud and projecting from the outer side thereof.

2. A wind powered apparatus as defined in claim 1 wherein each of said rotor vanes is substantially triangular in configuration, and has an area approximately equal to the area of an open space located in the same plane as is each blade and positioned between each respective blade and said common rotational axis.

3. A wind powered apparatus as defined in claim 1 wherein said rotor vanes are aligned in pairs occupying a common plane.

4. A wind powered apparatus as defined in claim 1 wherein said shroud further includes:
    a ring lying in plane extending normal to said common rotational axis; and
    guy wires extending from said ring to said rotational axis and collectively defining a generally double conical array, said guy wires including a plurality of pairs of guy wires in which one wire in each of said pairs is secured to one of the side edges of one of said vanes, and the other guy wire in the same pair is secured to the other of the side edges of said one vane.

5. A wind powered apparatus as defined in claim 1 wherein said supporting means comprises:
    a vertical shaft; and
    a pair of journal hubs supporting said shroud on said shaft for rotation about the axis thereof.

6. A wind powered apparatus as defined in claim 3 wherein said rotor is further characterized in including a plurality of circumferentially spaced, radially extending spokes, each of said spokes extending between, and secured to, an edge of each of said rotor vanes in one of said pairs of rotor vanes.

7. A wind powered apparatus as defined in claim 2 wherein each of said rotor blades is characterized in including a radially outer edge portion having a turned over fence flap extending at an angle of 45° relative to the major plane of the rotor blade, and projecting from the remainder of the respective blade in a direction opposite the direction of rotation of the rotor within the shroud by wind impingement.

8. A wind powered apparatus as defined in claim 1 wherein each of said shroud vanes includes:
    a primary vane portion having a leading edge, and a trailing edge located closer to said stabilizer means than the leading edge; and
    a flap secured to the trailing edge and extending across, and spaced radially outwardly from, the leading edge of the next adjacent shroud vane.

9. A wind powered apparatus as defined in claim 1 wherein said stabilizer means comprises a substantially monoplanar stabilizer vane positioned in a plane containing said common rotational axis.

10. A wind powered apparatus as defined in claim 1 wherein each of said triangularly shaped shroud vanes terminates in an apex spaced radially outwardly from said rotational axis, said vanes collectively defining a pair of open air admission zones spaced axially along said rotational axis and adjacent the respective top of the upper half of said shroud and bottom of the lower half of said shroud.

11. A wind powered apparatus as defined in claim 9 wherein each of said rotor vanes is substantially triangular in configuration, and has an area approximately equal to the area of an open space located in the same plane as is each blade and positioned between each respective blade and said common rotational axis.

12. A wind powered apparatus as defined in claim 10 wherein said rotor vanes are aligned in pairs occupying a common plane.

13. A wind powered apparatus as defined in claim 12 wherein said shroud further includes:
- a ring lying in a plane extending normal to said common rotational axis; and
- guy wires extending from said ring to said rotational axis and collectively defining a generally double conical array, said guy wires including a plurality of pairs of guy wires in which one wire in each of said pairs is secured to one of the side edges of one of said vanes, and the other guy wire in the same pair is secured to the other of the side edges of said one vane.

14. A wind powered apparatus as defined in claim 13 wherein said rotor is further characterized in including a plurality of circumferentially spaced, radially extending spokes, each of said spokes extending between, and secured to, an edge of each of said rotor vanes in one of said pairs of rotor vanes.

15. A wind powered apparatus as defined in claim 14 wherein each of said rotor blades is characterized in including a radially outer edge portion having a turned over fence flap extending at an angle of 45° relative to the major plane of the rotor blade, and projecting from the remainder of the respective blade in a direction opposite the direction of rotation of the rotor within the shroud by wind impingement.

16. A wind powered apparatus as defined in claim 15 wherein each of said shroud vanes includes:
- a primary vane portion having a leading edge, and a trailing edge located closer to said stabilizer means than the leading edge; and
- a flap secured to the trailing edge and extending across, and spaced radially outwardly from, the leading edge of the next adjacent shroud vane.

17. A wind powered apparatus comprising:
an external wind shielding shroud including
- a first plurality of vanes collectively arrayed as one-half of a first conical figure; and
- a second plurality of vanes collectively arrayed as one-half of a second conical figure having its base abutting the base of said first conical figure with said first and second vane arrays terminating at a common plane extending normal to the axes of said conical figures;

means supporting said shroud for rotation about a vertical axis;

a rotor disposed partially within and partially without said shroud and connected to said supporting means for rotation about said vertical axis, said rotor including
- a plurality of circumferentially spaced, radially extending spokes projecting from said axis of rotation; and
- a plurality of circumferentially spaced, generally triangularly shaped rotor vanes each having an edge secured to one of said spokes, and each having an edge secured to a rod projecting from the radially outer end of the respective spoke to a point adjacent said vertical axis;

each of said rotor vanes lying in a plane containing said vertical axis of rotation and one of said spokes, said rotor vanes being arranged in coplanar aligned pairs with paired vanes disposed on, and secured to, opposite sides of each of said spokes, said vanes each terminating in an edge disposed radially outwardly from said axes of rotation to define therewith an open space having an area approximately equal to the area of each of said blades.

* * * * *